US008528060B2

(12) United States Patent
Di Crescenzo et al.

(10) Patent No.: US 8,528,060 B2
(45) Date of Patent: Sep. 3, 2013

(54) METHOD AND SYSTEM FOR PASSWORD PROTOCOLS IN THE BOUNDED RETRIEVAL MODE WITH SECURITY DICTIONARY ATTACKS AND INTRUSIONS

(75) Inventors: Giovanni Di Crescenzo, Chatham, NJ (US); Richard J. Lipton, Atlanta, GA (US); Sheldon Walfish, Brooklyn, NY (US)

(73) Assignee: Telcordia Technologies, Inc., Piscataway, NJ (US)

( * ) Notice: Subject to any disclaimer, the term of this patent is extended or adjusted under 35 U.S.C. 154(b) by 1156 days.

(21) Appl. No.: 11/644,368

(22) Filed: Dec. 22, 2006

(65) Prior Publication Data

US 2007/0180260 A1 Aug. 2, 2007

Related U.S. Application Data

(60) Provisional application No. 60/753,180, filed on Dec. 22, 2005.

(51) Int. Cl.
*H04L 29/06* (2006.01)

(52) U.S. Cl.
USPC ............... 726/6; 713/180; 713/181; 713/182; 713/183; 713/189; 713/151; 713/155; 713/171; 713/175; 713/176; 380/29; 380/42; 380/270; 380/277; 714/759; 714/781; 714/783; 382/100; 382/101; 382/141; 382/181

(58) Field of Classification Search
USPC .................. 713/180–183, 189, 151, 155, 19, 713/171, 176, 175; 380/29, 42, 270, 277; 714/759, 781, 783; 382/100, 101, 141, 181; 707/1–10, 100–3, 107, 200–204
See application file for complete search history.

(56) References Cited

U.S. PATENT DOCUMENTS

| 6,226,629 B1 * | 5/2001 | Cossock ........................... 707/3 |
| 6,834,112 B1 * | 12/2004 | Brickell ........................ 380/279 |
| 2003/0093633 A1 * | 5/2003 | Thiesfeld et al. ............. 711/154 |

(Continued)

*Primary Examiner* — William Goodchild
*Assistant Examiner* — Hee Song
(74) *Attorney, Agent, or Firm* — Philip J. Feig

(57) ABSTRACT

Efficient secure password protocols are constructed that remain secure against offline dictionary attacks even when a large, but bounded, part of the storage of a server responsible for password verification is retrieved by an adversary through a remote or local connection. A registration algorithm and a verification algorithm accomplish the goal of defeating a dictionary attack. A password protocol where a server, on input of a login and a password, carefully selects several locations from the password files, properly combines their content according to some special function, and stores the result of this function as a tag that can be associated with this password and used in a verification phase to verify access by users. Two main instantiations of our method are given; in one, a combination of mathematical tools, called dispersers and pairwise-independent hash functions is used to achieve security against adaptive intrusions (dispersers make sure that the password of each user depends on randomly chosen locations in a large password file, and pairwise-independent hash functions help in making this dependency sufficiently random); in a second one, a combination of mathematical tools, called k-wise independent hash functions and locally-computable and strong extractors (k-wise independent hash functions make sure that the locations chosen in the large password file from each password are sufficiently random, and locally-computable and strong extractors are used to combine the contents of these locations to generate a single long random value, which makes verification harder for the adversary to foil).

4 Claims, 3 Drawing Sheets

(56) References Cited

U.S. PATENT DOCUMENTS

| | | | |
|---|---|---|---|
| 2006/0036871 A1* | 2/2006 | Champine et al. | 713/183 |
| 2006/0143705 A1* | 6/2006 | Sentoff | 726/19 |
| 2008/0049939 A1* | 2/2008 | Canetti et al. | 380/277 |
| 2008/0077807 A1* | 3/2008 | Hicks | 713/193 |

* cited by examiner

METHOD AND SYSTEM FOR PASSWORD PROTOCOLS IN THE BOUNDED RETRIEVAL MODE WITH SECURITY DICTIONARY ATTACKS AND INTRUSIONS

CROSS-REFERENCE TO RELATED APPLICATIONS

This application claims the benefit of the filing date of U.S. Provisional Patent Application No. 60/753,180, filed Dec. 22, 2005, the disclosure of which is hereby incorporated herein by reference.

GOVERNMENT LICENSE RIGHTS

This invention was made with Government support under contract no. FA8750-04-C-0249 awarded by the Air Force Research Laboratory. The Government may have certain rights in this invention.

FIELD OF THE INVENTION

The present invention relates to the construction of efficient password protocols that remain secure against offline dictionary attacks even when a large, but bounded, part of the storage of a server responsible for password verification is retrieved by an adversary through a remote or local connection.

BACKGROUND OF THE INVENTION

Recently, significant press coverage has focused on attacks to computers and databases owned by private users and especially by government entities or private corporations. Attackers involved in such attacks (who may also be referred to as "intruders") can be differentiated into two types, according to whether the attacker uses digital messages from a remote location to perform the attack (whom we can call "external attackers") or the attacker uses digital messages from a location within the same entity that is attacked (whom we can call "internal attackers" or "insiders"). Partially motivated by this coverage of intrusions from both external attackers and insiders into databases containing highly sensitive information, this invention includes cryptographic protocols in the presence of intruders, under a novel and reasonable assumption on their power. This leads to a new investigation model, which is referred to as the Bounded Retrieval Model, since one of its major features of the model is that of assuming the existence of an upper bound on the amount of a party's stored data that can be retrieved by the attacker or adversary. In practice, this bound would be due to both physical and logical considerations. With respect to internal attackers, this upper bound may result from the capabilities of a simple Intrusion Detection System (IDS), which only needs to be capable of monitoring any large and repeated access to the party's stored data. With respect to external attackers, this upper bound is further minimized as a consequence of the inherent gap between the smaller availability of the communication bandwidth due to physical limits of the communication channel and the larger availability of storage memory: an attacker needing a large amount of time to retrieve large amounts of sensitive data will most likely be unable to maintain an unauthorized connection for enough time without being detected.

The model could be considered a non-trivial variation of the well-studied Bounded Storage Model, introduced in Ueli Maurer, Conditionally-Perfect Secrecy and a Provably-Secure Randomized Cipher, Journal of Cryptology, vol. 5, no. 1, pp. 53-66, 1992. In Stefan Dziembowski and Ueli Maurer, Optimal Randomizer Efficiency in the Bounded-Storage Model, in Journal of Cryptology, vol. 17, no. 1, pp. 5-26 and the references therein further studies of several cryptographic tasks, such as key-agreement, encryption, oblivious transfer, and time-stamping, etc are described. The present model postulates a fixed upper bound on the storage capacity, but no bound at all on the computational power, of the adversary attacking a cryptographic protocol. Thus, with respect to the standard investigation model used in the cryptography literature, where the upper bounds on the attacker's storage and computational power are uniquely due to current technological limitations on both storage and computational power (often referred to as "polynomial in the security parameter" in the literature), the Bounded Storage Model achieves much higher security at the expense of a stronger assumption on the adversary's storage capability. Namely, it assumes a fixed upper bound on storage capacity that may be smaller than what is indicated by current technological limitations. Analogously, the bounded retrieval model also avoids fixed upper bounds on the computational power of the adversary at the expense of a stronger assumption on the adversary's retrieval capability. Namely, it assumes a fixed upper bound on retrieval capacity that may be smaller than what is indicated by current technological limitations. However, this retrieval assumption is supported by more specific technological considerations related to the availability of an IDS and/or to the gap between communication bandwidth and storage memory.

The importance of securing the server password file has been well-known for many years, and is discussed in detail, for instance, in N. Provos and D. Mazieres, A Future-Adaptable Password Scheme, in Proceedings of the Annual USENIX Technical Conference, 1999 and in D. C. Feldmeier and P. R. Karn, UNIX Password Security—Ten Years Later, in Proceedings of Crypto '89, LNCS, no. 435, Springer-Verlag, pp. 44-63. Various aspects of password protocols have been studied in the security literature. One important area is that of securing password protocols where the communication goes over an insecure network as described in, e.g., S. Halevi and H. Krawczyk, Public-key Cryptography and Password Protocols, in Proc. of the 5th annual ACM conference on Computer and Communications Security, pp. 122-131, 1998 for schemes based on public-key encryption and S. Bellovin and M. Merrit, Encrypted Key Exchange, in Proc. of the 1992 Internet Society Network and Distributed System Security Symposium; S. Bellovin and M. Merrit, Augmented Encrypted Key Exchange, in Proc. of the 1st ACM Conference on Computer and Communication Security}, pp. 224-250; S. Patel, Number theoretic attacks on secure password schemes, in Proc. of the 1997 IEEE Symposium on Security and Privacy; and T. Wu, The secure remote password protocol, in Proc. of the 1998 Internet Society Network and Distributed System Security Symposium for heuristic schemes not using public keys.

SUMMARY OF THE INVENTION

Despite their often noticed weaknesses, password protocols remain the most widely used method for authenticating computer users. In traditional password schemes (such as the scheme used for the widely-used UNIX computer operating system), a computer user (hereinafter referred as the user) wants to authenticate herself to a computer server (hereinafter referred as the server) to login into her computer account. Such schemes can be divided into a registration phase and a verification phase. In the registration phase, the server stores the output returned by a mathematical function with some special properties computed using as input a given user password in a single record of a password database, often called the "password file". The function used has to be efficiently computable but hard to invert in a feasible computation time; such functions are called "one-way functions" and are ubiquitously used in the cryptography literature. In order to verify a user login attempt, the server simply computes the same one-way function on a putative password supplied by the user attempting to login, and compares it to the stored value in the password database. If the values match, the user is allowed to log in. An adversary trying to impersonate an authorized user can always try a so-called "online attack", which comprises repeatedly trying the user login name with a new password, until the right password is guessed. However, if the user password is chosen with enough randomness, each attempt in the online attack is extremely unlikely to succeed, and current servers are programmed to prevent users from continuing their authentication session after just a few unsuccessful attempts. Unfortunately, the password database itself is typically rather small, and can be quickly and easily retrieved by any adversary capable of intruding into the server memory by, e.g., exploiting software bugs. Although the password database does not directly contain any of the user passwords, it opens up the possibility of a so-called "offline dictionary attack" to the adversary. In such an attack, the adversary can utilize the information contained in any single record of the password database by attempting to apply the one-way function to every word in a dictionary in the hopes that it will match the content of that record due to the user's tendency to utilize a dictionary word as a password. Although too large to be efficiently searched by a human, dictionaries are typically small enough so that they are efficiently searchable by a computer, thus making this offline dictionary attack quite feasible.

The present invention provides a design scheme so that an adversary is required to access a very large quantity of data when trying to carry out these attacks. Due to technology advances, computer storage is a static, inexpensive resource, which is readily available today, such that a server can easily provide huge quantities of storage. External bandwidth is a time-dependent resource and is certainly much less available than storage. Furthermore, the bandwidth available to a remote or internal attacker may be easily controlled by physical means, or even by monitoring traffic at the server's interface to the outside world. By using this gap between server storage capacity and the adversary's ability to retrieve stored data, it is possible to realize a significant server security advantage over the adversary, thus making even an off-line dictionary attack just slightly more powerful than the practically unsuccessful online attack.

Typically a password is located in a specific line of a storage file associated with a respective login identity. In order to defeat an adversary's dictionary attack, instead of locating the password in a specific line of the storage, the password is scattered into different lines of the storage file. The invention relies on a registration algorithm and a verification algorithm to accomplish the goal of defeating a dictionary attack, as well as any other attacks based on heavy computation time from the attacker. A partial download of the storage, as might be accomplished when an adversary improperly accesses a computer device, will not enable the adversary to re-create the password, except with very small probability (comparable to the probability of guessing an unknown password).

The invention concerns a password protocol where a server, on input of a login and a password, carefully selects several locations from the password files, properly combines their content according to some special function, and stores the result of this function as a tag that can be associated with this password and used in a verification phase to verify access by users.

Accordingly, a new model is provided where the server has a very large password file (since memory is very inexpensive today). The concept is that an adversary will not be able to access more than a portion of this file without being detected and will thus miss some of the random file locations used by the server to store password data, and therefore the adversary will not be able to guess any actual passwords.

The solution uses a non-trivial combination of mathematical tools, called dispersers and pairwise-independent hash functions, which have never been used before for password protocols. Dispersers make sure that the password of each user depends on "well-dispersed" (or, in other words, random-looking) locations in the large password file. Pairwise-independent hash functions help in making this dependency random enough.

The model is used to analyze possibly the simplest cryptographic task: entity authentication via password verification, which will hereinafter be referred to as "password protocol".

The description of a password protocol can be divided into two phases: a registration phase and a verification phase. A user wanting to be included in the system enters the registration phase, where the user can register her login log and her password pw with a server S. The server S stores in the password file a function of the user password during registration by computing a tag=h(pw), where h is a one way hash function fixed at the beginning of the system and records <log, tag> for each user. Later, a user wanting to identify herself enters into the verification phase, where she sends a login name log' and a password pw' to the server S. The server S computes tag'=h(pw'). The server S authorizes login if the record <log', tag'> was previously stored in the password file.

A dictionary attack uses the fact that users choose random passwords from a small dictionary D. In this attack, an adversary A can "intrude" into S and retrieve record <log, tag> from the password file. The intrusion is often performed by attackers by exploiting server software bugs or vulnerabilities, and the files are typically retrieved by FTP access, email, etc. Since D is small, A can efficiently compute h(pw) for all pw in D until it finds the one that satisfies the equality h(pw)=tag.

In accordance with this invention the password data is stored in a very large file F, which is assumed to have m records. Adversary A can only retrieve parts of the file F. Even if A selects parts of the file F to retrieve, A will be unable to perform the above offline dictionary attack (or even clever variations of it). The difficult problem is to provide an efficient verification process (and registration process) using such a large file F.

Adversary A is not assumed to be computationally bounded (for sake of generality) and thus is able to run dictionary attacks. Two types of intrusions from A are distinguished: in "non-adaptive intrusions", A carefully chooses up to q locations and then retrieves the contents of these locations; in "adaptive intrusions", A chooses up to q locations one at a time, possibly basing the choice of the next location on the content of all previously retrieved locations. Retrieving adaptively may allow a better choice of locations but also slows down the retrieval process.

The problems that are overcome are: "correctness", meaning that honest users pass the verification phase (i.e., gain access) upon sending the correct pair (log, pw); "security" where even if an adversary obtains up to q out of m locations in the password file, it can pass the verification phase with at most a very small success probability $\epsilon$; and "efficiency" which minimizes the server lookup complexity I (the maximum quantity of blocks read by the server during a user login attempt). It is important that the complexity I should be much smaller than q to obtain efficient protocols.

The invention will be more clearly understood when the following description is read in conjunction with the accompanying drawings.

DETAILED DESCRIPTION

Figure 1:
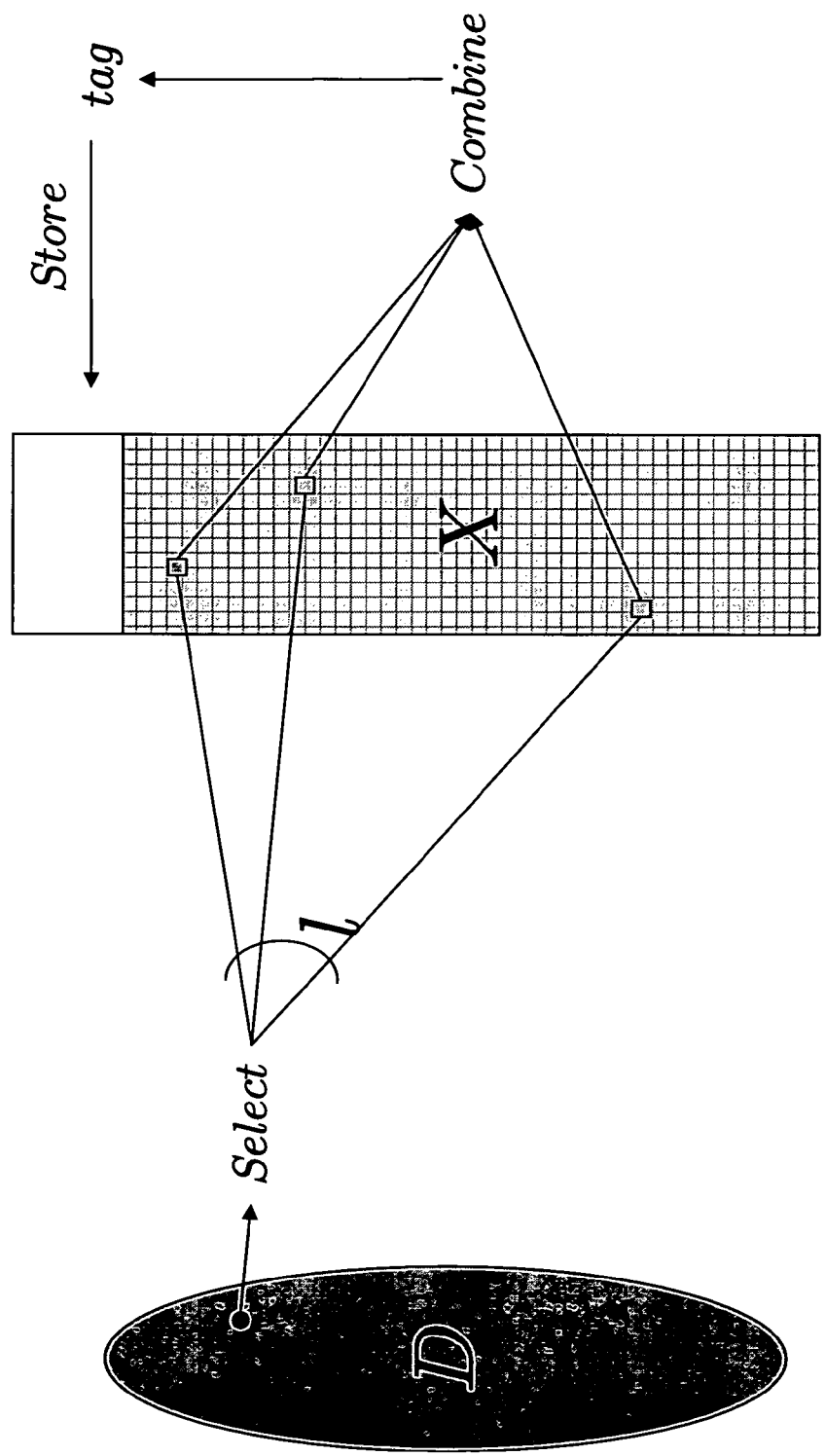
FIG. 1 is a schematic diagram of a password protocol.

Password database files are created that are so large that either (1) they cannot be retrieved in their entirety by a local or remote intruder in any reasonable time due to access or bandwidth limitations, or (2) any such huge retrieval operation is easily detected. Detection of a huge retrieval operation can be obtained using very simple and efficient intrusion detection mechanisms. See, e.g., S. Axelsson, Research in Intrusion-Detection systems: A Survey, in Technical Report 98-17, Dept. of Comp. Eng., Chalmers, Univ. of Technology, Goteborg, Sweden, 1998, at http://citeseer.ist.psu.edu/axelsson98research.html for a survey and G. Di Crescenzo, A. Ghosh, and R. Talpade, Towards a Theory of Intrusion Detection. in Proc. of European Symposium on Research in computer Security (ESORICS 2005), vol. 3679 of LNCS, pp. 267-286, Springer-Verlag, for a theoretical model of intrusion detection. Specifically, a huge retrieval would be considered an anomalous event, thus triggering actions such as closing the adversary's access port or preventing access to the storage area from any insider. The simplest situation where an adversary cannot retrieve the entire file is clearly when an adversary has relatively limited bandwidth (such as an attacker launching an attack from her slow Internet access at her home). In fact, this limitation is already present in existing networks, as even the high-bandwidth connections commonly available today may require minutes to transfer even modest data amounts such as 1 gigabyte. As another typical scenario, assume the server is distributing the password database in several locations and that the adversary is either unaware of the position of some of the locations or cannot physically access some of them.

An upper bound is placed on the quantity of information from the server storage area that is retrieved by the adversary during an attack. Security in the model can be information theoretic in nature, which is quite desirable due to the brute-force nature of off-line dictionary attacks. There are two main classes of attacks in this model: (1) non-adaptive retrievals, modeling the case where the adversary must pre-select the data it wishes to collect prior to the beginning of the actual data retrieval phase; and (2) adaptive retrievals, modeling an adversary selecting each single location to be retrieved based on the content of all previously retrieved locations. In both classes the total information retrieved by the adversary is bounded by a fixed parameter. Each of these two classes of attacks models real world scenarios.

Adaptive intrusions would seem to model the most general scenario, where the adversary may have arbitrary access to data blocks of its choice, such as retrieving data interactively from an insecure network file server, e.g., via the file transfer protocol (FTP). Although it would seem that an adversary, if possible, would always choose to perform an adaptive retrieval attack, it should be keep in mind that adaptive intrusions also require the adversary to expend time to examine the information that is being retrieved and therefore may actually provide the adversary with less information than in the case of a static retrieval. In this model, access to the entire data file by the adversary is not ruled out, but it can be easily prevented using intrusion detection techniques.

On the other hand, the model does not include the case in which the server is totally compromised by an attacker, where the latter would actually be able to directly observe the passwords received from users during their login attempts anyway.

In designing password protocols in the bounded retrieval model, attention is paid to various parameters for security, e.g., the adversary's advantage over the online attack success probability, and the adversary's retrieval strategy, and efficiency, e.g., the server's lookup complexity. This allows for appropriately set target goals for both. Accordingly, it is useful to keep in mind the following two important issues about parameters:

First is an adversary's advantage vs. online attack success probability. Although it is certainly desirable to have a password scheme with zero or an exponentially small adversary advantage probability, in practice it is essentially just as desirable to have a password scheme with the adversary's advantage comparable to the online attack success probability as the overall attacker success probability is the sum of the two values.

Second is server running time vs. adversary's retrieval bound. Although it would seem easier to design provably secure password schemes where at each user registration or verification the server reads more locations than the adversary is ever allowed, such a design severely restricts the efficiency of the scheme and its practical applicability and is therefore not considered a goal of the invention.

The combination of efficiency and security properties desired requires the adversary's advantage to be provably comparable to the online attack success probability and the server running time (as measured by the number of data blocks read) to be significantly smaller than the running time.

The main protocols that achieve these goals, called SCS (Select, Combine and Store) and HE (Hashing and Extraction), are variation of a single protocol, and achieve the desired security against adaptive and non-adaptive retrievals, respectively. Both protocols achieve high efficiency in that the server lookup complexity is much smaller than the adversary retrieval limit. Protocol SCS is based on two mathematical tools, called dispersers and pairwise-independent hash functions and guarantees both security against adaptive adversaries and that the adversary success probability is not significantly larger than the online attack success probability. Protocol HE is based on two mathematical tools, called t-wise independent hash functions and strong extractors and achieves security against static retrieval attacks, ensuring exponentially-small adversary success probability without any computational assumption. Protocols SCS and HE can be combined, resulting in a single scheme that simultaneously enjoys both of their desirable security properties.

The following is a description of the password protocol referred to as SCS, since the server storage algorithm in this protocol is based on three basic actions: Select, Combine and Store. Specifically, on an input comprising a login and a password, the server carefully selects several locations from the password files, combines their content according to some function, and stores the result of this function as a tag that can be associated with this password. We instantiate the "select" action of the SCS scheme by using dispersers, and the "combine" action using a pairwise-independent hash function. The construction has server lookup complexity lower than the adversary retrieval bound, and, moreover, the following properties: adversary success probability comparable with the security against on-line attack; non-adaptive server lookup strategy; constant parallel time complexity; and security against adaptive adversaries. More precisely, the result is the following:

Theorem 1. There exists a password protocol SCS=(Set, F, Reg, Ver) with parameters Param=(n,t,d,m,q,l), that is $\epsilon$-secure against a bounded retrieval attack from an adaptive intrusion, and such that, for any t,d,m,q, it holds that $\epsilon=m^3/\{1\cdot(m-q)^2\cdot\frac{1}{2}^d\}$, $l=2b$, where $b=\log^2(d)\cdot\text{poly}(\log\log d)+(\log d)\cdot(\log(m/(m-q)))$.

In the above theorem, and in the remainder of the specification, m denotes the quantity of locations of the password file F, q is the maximum number of locations retrieved by the adversary, 1 is the number of locations read by the server at verification stage, using algorithm Ver, n is the number of bits in each location in the password file F, t is the number of users of the system, and d is the number of bits in a password.

Construction of Protocol SCS

The protocol SCS=(F, Set, Reg, Ver) uses a polynomial-time computable function sel: $\{0,1\}^d \cdot \{0,1\}^d \to \{1,\ldots,m\}^1$, that is later instantiated using dispersers, and a family H of pairwise-independent hash functions $h_\omega: \{0,1\}^{(n1+2d)} \to \{0,1\}^n$ (selection of which parameterizes the Reg and Ver algorithms, below).

(In the above, the notation $\{x, y, \ldots\}^c$ denotes the set of c-tuples, where each element of the c-tuple belongs to set $\{x, y, \ldots\}$, and the notation sel: $\{0,1\}^d \cdot \{0,1\}^d \to \{0, 1, \ldots, m\}^1$ denotes the function that maps an input from $\{0,1\}^d$ and an input from $\{0,1\}^d$ to an output in set $\{1, \ldots, m\}^1$).

Following are descriptions of algorithms Set, Reg, and Ver, and then one instantiation of the function sel.

Algorithm Set.

Algorithm Set, on input parameters d,t,n,l,m,q in unary, returns an m-location password file F, which can be parsed as $F=X\circ T$ with $|X|=m_x$ and $|T|=t$, and thus $m=m_x+t$. X is initialized as an array of values $X[1], \ldots, X[m_x]$ uniformly chosen from $\{0,1\}^n$, and T is initialized as an empty array of t locations.

Algorithm Reg

The registration algorithm maps a login and a password to a subset of locations in the set of locations containing random elements, combines their content by computing a tag as their sum, and stores the tag. More precisely, on input $\log_i$, $pw_i$, and F, algorithm Reg runs the following steps:
1. compute $(loc_1, \ldots, loc_1)=\text{Select}(\log_i, pw_i)$;
2. compute $tag_i=h_\omega(\log_i|pw_i|X[loc_1]| \ldots |X[loc_1])$,
3. store $tag_i$ into T by setting $T[i]=tag_i$.

Algorithm Ver

The verification algorithm recomputes the tag corresponding to the input login and password and checks that it is equal to the tag stored during the registration phase. More precisely, with input log', pw', F, where $F=X|T$, algorithm Ver runs the following steps:
1. compute $(loc'_1, \ldots, loc'_1)=\text{Select}(\log', pw')$;
2. let j in $\{1, \ldots, t\}$ be such that $\log_j=\log'$;
if there exists no such j then return: 0 and halt;
verify that $T[j]=h_\omega(\log'|pw'|X[loc'_1]| \ldots |X[loc'_1])$;
if so, return: "verification passed"; else return: "verification not passed".

Instantiation of Function Select

According to the present invention, it is only necessary to apply dispersers, but since the mathematical tools known as $(k,\delta)$-extractors are also $(k,\delta)$-dispersers (this can be seen by setting D equal to the uniform distribution over subset A), the invention applies a certain kind of extractors. Extractors are very often used mathematical functions that uses a totally random string of bits to map a partially random input string of bits into an almost totally random output string that captures the randomness of the partially random input. In particular, we are interested in extractors that firstly maximize the parameter c, denoting the extractor output, so that it is as close as possible to the sum of the min-entropy of the source and the number of real random bits used. Secondly, it is of interest to minimize the value of parameter b for that to happen. This choice criterion is based on that of minimizing the adversary's advantage first, and then, further minimizing the server sequential running time. Note that in this scheme the parallel running time is constant with respect to the lookup complexity l, regardless of which extractor is chosen. We could use several extractors from the computer science literature, but for sake of completeness recall such a construction; specifically, using the following result from O. Reingold, S. Vadhan, and A. Wigderson, Entropy Waves, The Zig-Zag Graph Product, and New Constant-Degree Expanders and Extractors, in Electronic Colloquium on Computational Complexity TR01-018 (another version is in Annals of Mathematics, vol. 155, pp. 157-187, 2002.)

For any $0 \leq \alpha < a$ and $\delta > \exp\{(-\alpha/(\log^*\alpha)^{O(\log^*\alpha)})\}$, there exists an explicit $(k,\delta)$-extractor Ext: $\{0,1\}^a \cdot \{0,1\}^b \to \{0,1\}^c$ such that $k=a-\alpha$, $b=O(\log^2(a)\cdot\text{poly}(\log\log a)+(\log a)\cdot(\log(1/\delta)))$ and $c=k+b-2\log(1/\delta)-O(1)$.

Select can be instantiated as the function returning all outputs of the above extractor, when given the password as a first input and all possible l values as a second input. In a graph-based formulation, these would be all neighbors of the node associated with the password.

More formally, for any parameters n,t,d,m,q, where $m=m_x+t$, we can instantiate Select as follows. For log in $\{0,1\}^d$ and pw in $\{0,1\}^d$, we define Select (log, pw)= $(loc_1, \ldots, loc_1)$, where $loc_j=\text{Ext}((\log|pw),j)$ for $j=1, \ldots, l$; algorithm Ext $\{0,1\}^a \cdot \{0,1\}^b \to \{0,1\}^c$ is the $(k,\delta)$-extractor guaranteed from above, where $\alpha=d$, $a=2d$; $b=O(\log^2(2d)\cdot\text{poly}(\log\log 2d)+(\log 2d)(\log(m/(m-q))))$; $c=\log m$; $l=2^b$; $\delta=1-q/m$; and $k=\log m-l-2\log(m/(m-q))-O(1)$.

Above it was shown that it is possible to construct password protocols secure against bounded retrieval attacks by adaptive adversaries, and simultaneously have low lookup complexity. The adversary's advantage in the previous construction is not significantly larger than the on-line attack success probability, and essentially meets the lower bound from Giovanni Di Crescenzo, Richard J. Lipton, Shabsi Walfish, Perfectly Secure Password Protocols in the Bounded Retrieval Model, in Proceedings of the 3rd Theory of Cryptography Conference, TCC 2006, New York, N.Y., USA, Mar. 4-7, 2006, Proceedings. Lecture Notes in Computer Science vol. 3876 Springer 2006, pp. 225-244. The possibility of achieving an even smaller adversary advantage (e.g., exponentially small) while maintaining an efficient lookup complexity will be considered. Since the server lookup strategy is adaptive, the lower bound from Di Crescenzo et al supra does not apply. The HE scheme remains incomparable to the SCS scheme above because the former is only secure against non-adaptive adversaries. The scheme is referred to as HE, for Hashing and Extraction, according to the strategy used by the server registration algorithm. Formally, we obtain the following:

Theorem 2. There exists a protocol HE=(Set, Sample, Reg, Ver) with parameters Param=(n,t,d,m,q,l), that is $\epsilon$-secure against a bounded retrieval attack of static type, and such that, for any t, d, q, m, it holds that $\epsilon=(2t+3)\cdot 2^{-\lambda}$, $m>q+t\geq[1=t+O(d+\lambda)]$ and $n=O(\lambda)+2d$.

In a HE scheme the server uses an adaptive lookup strategy and therefore the exponentially small upper bound on $\epsilon$ does not contradict the lower bound above.

Tools used by the HE protocol. The HE protocol uses two mathematical tools: t-wise independent hash functions, where t is the number of users, and locally computable and strong extractors.

Locally-computable and strong extractors. Recall two additional properties that extractors may satisfy. The definition of strong extractors requires that the extractor output remains statistically close to random even when conditioned on the value of the random seed (R); furthermore, the definition of locally computable extractors requires that the extractor reads only a small subset of the bits contained in the large input distribution that the entropy is to be extracted from this is for efficiency reasons only. The formal definitions follow:

A function Ext: $\{0,1\}^a \times \{0,1\}^b \to \{0,1\}^c$ is called a strong $(k,\delta)$-extractor if for any distribution D on $\{0,1\}^a$ with min-entropy at least k, the distribution $U(b) \times N(D,U(b))$ is $\delta$-close to distribution $U(b) \times U(c)$, where $N(D,U(b))$ is defined as $\{x\leftarrow D;\ e\leftarrow\{0,1\}^b;\ y\leftarrow Ext(x,e):\ y\}$, and, for any z, $U(z)$ denotes the uniform distribution over $\{0,1\}^z$.

An extractor Ext $\{0,1\}^a \times \{0,1\}^b \to \{0,1\}^c$ is l-locally-computable if for any $R\in\{0,1\}^b$, the value of R uniquely determines the bit locations in $x\in\{0,1\}^a$ used while computing Ext(x,R) and the number of such locations is at most l.

Any construction of k-wise independent hash functions from the computer science literature is usable; additionally, it is possible to use several locally-computable and strong extractors from the computer science literature, but for sake of completeness we recall such a construction; specifically, we use the following result in S. Vadhan, On constructing locally computable extractors and cryptosystems in the bounded storage model, in Journal of Cryptology, vol. 17, no. 1, pp. 43-77, 2004.

Let $\rho$, $\sigma$ be arbitrary constants>0. For every $a\in N$, $\delta>\exp(-a/2^{O(\log^* a)})$, $c\leq(1-\sigma)a\rho$, there is an explicit l-locally computable and strong $(k, \delta)$ extractor Ext: $\{0,1\}^a \times \{0,1\}^b \to \{0,1\}^c$ such that:
1. $k=a\rho$
2. $b=\log a+O(\log c+\log(1/\delta))$
3. $l=(1\sigma)kc/n+\log(1/\delta))$ Construction of protocol HE. Consider, for simplicity, an algorithm Sample that just uniformly and independently selects a password from $\{0,1\}^d$.

Algorithm Set

Let the data block size $n=2d+\lambda$, where $\lambda$ is the security parameter. Set initializes a t-location array W with a uniformly chosen t-wise independent hash function $h_\omega\{0,1\}^d \to \{0,1\}^n$. Set then initializes X as an array of $m_x$ locations containing uniformly and independently chosen values in $\{0,1\}^n$. Additionally, Set initializes an empty array T with t empty locations of n bits each, and then sets $F=T\circ W\circ X$. Observe that the total number of data blocks in F is $m=2t+m_x$.

Algorithm Reg

The registration algorithm first hashes the login name and the password to a random value using the t-wise independent hash function specified by the W component of F, to produce a seed value R. Note that this step makes the server's lookup strategy adaptive, as the computation of R depends on the contents of W, and subsequent lookup operations in X will depend on R. The extractor is applied to the X component of F using the previously computed seed R in order to produce a (nearly) uniform random output. The resulting output R' may then be used as the tag associated with this password, and is stored in the T component of F. Formally, on input i, $\log_i$, $pw_i$, F, where $F=T\circ W\circ X$, algorithm Reg does the following:
1. set w=(W[1], ..., W[t]) and $R=h_\omega(\log_i,|pw_i)$.
2. set R'=Ext(X,R).
3. store $tag_i$=R' in location T[i].

Algorithm Ver

The Ver algorithm is essentially identical to the Reg algorithm, only after computing tags, rather than storing it in the T[i] location in F, the value is compared with the previously stored value in T[i], and the result of the comparison is output. The total number of lookups performed by Ver is $l=t+l+1$. Formally, Ver, on input j, $\log'_j$, $pw'_j$, $F=T\circ W\circ X$, does the following:
1. set $\omega$=(W[1], ..., W[t]) and $R=h_\omega(\log'_j,|pw'_j)$.
2. set R'=Ext(X,R).
3. if T[j]=R' then return: "verification passed" else return: "verification not passed"

An extension: Combining protocols SCS and HE. Recall that protocol SCS is secure against adaptive adversaries but allows the adversary to achieve a non-negligible advantage (which is optimal in the setting of adaptive intrusions). Furthermore, protocol HE only allows the adversary to achieve at most exponentially-small advantage, but is only secure against non-adaptive adversaries. We would like to achieve the "best of both worlds" with a single scheme that limits the adversary to a negligible advantage in case of static intrusions, but remains secure even under an adaptive attack. Fortunately, such a solution is indeed possible. We simply modify the construction of SCS, replacing the input $pw_i$ with the $tag_i$ computed as in protocol HE. That is, the final $tag_i$ values computed using SCS will now be based on "password" inputs/values taken from the $tag_i$ values computed via HE using the user's actual password. It can be shown that the resulting scheme achieves security comparable to that of HE under static intrusion attacks, and comparable to that of SCS under adaptive intrusion attacks.

Figure 2:
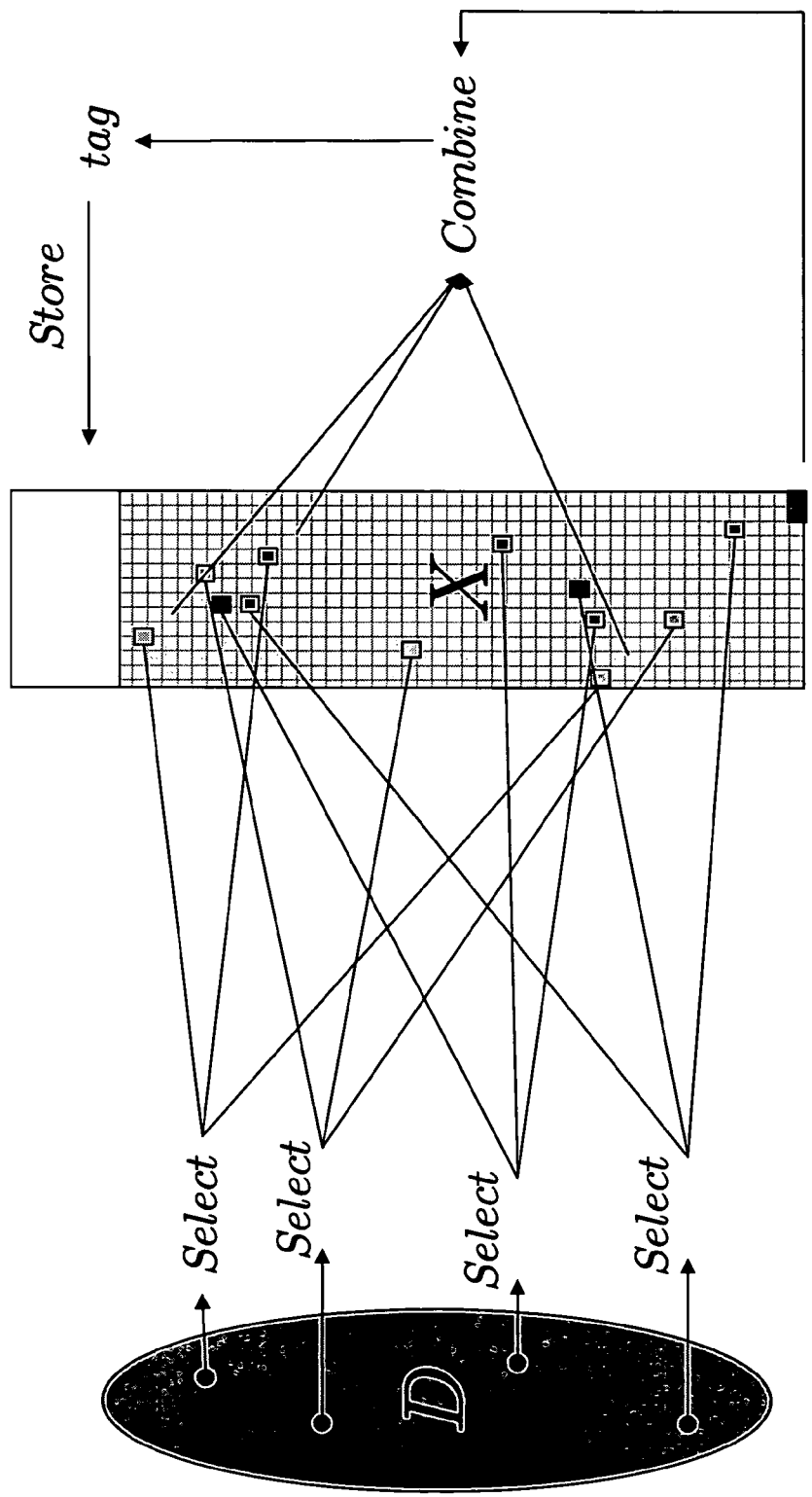
FIG. 2 is a schematic diagram of the SCS (Select, Combine, and Store) method for providing security against non-adaptive retrieval attacks.
Figure 3:
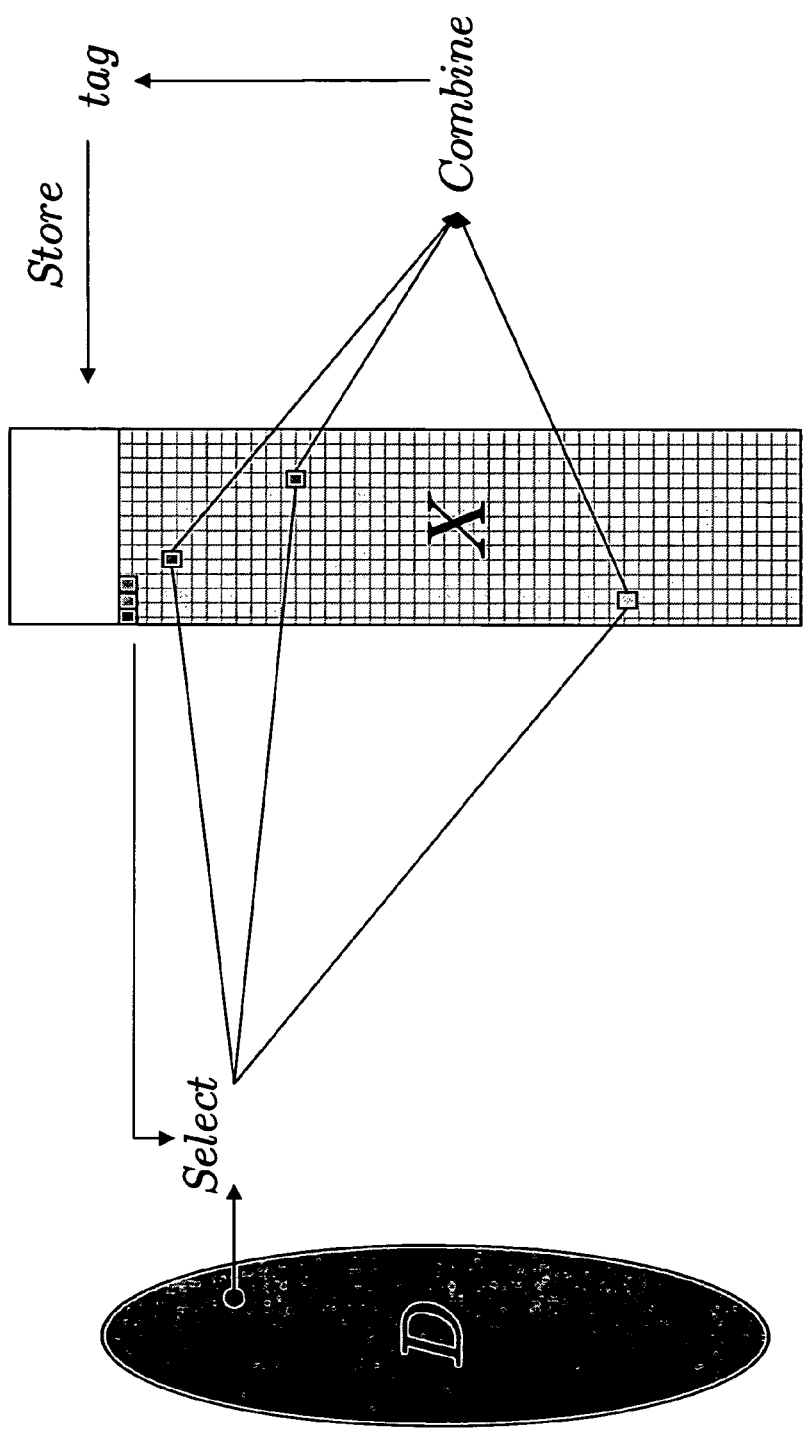
FIG. 3 is a schematic diagram of a HE (hashing and extraction) method for providing stronger security against non-adaptive retrieval attacks.

FIG. 1 is a schematic illustration of a password protocol according to the teachings of the present invention. A password pw is selected from a dictionary D and assigned to l locations in file F by function Select. A function Combine is applied to the password for creating a tag. Combine ensures that tag looks random unless the adversary A retrieves all l locations chosen by G. In FIG. 2 the select, combine and store (SCS) method providing security against non-adaptive retrieval attacks is employed. This method implements Select using dispersers or extractors, and Combine using pairwise-independent hash functions. In FIG. 3, the HE (hashing and extraction) method for providing stronger security against non-adaptive retrieval attacks is employed so that the function Select is implemented as a t-wise independent hash-function and the function Combine is implemented using a locally-computable and strong extractor.

While there has been described and illustrated password protocols in the bounded retrieval model with security against dictionary attacks and intrusions, it will be apparent to those skilled in the art that variations and modifications are possible without deviating from the broad teachings and principles of the inventions, which shall be limited solely by the scope of the claims appended hereto.

What is claimed is:

1. A method of constructing login/password protocols for registering and verifying logins/passwords in a server comprising the steps of:
   registering the logins/passwords comprising the steps of:
       selecting memory storage locations fewer than all memory storage locations in the server for login/password data based on the login/password data;
       combining random content of the selected memory storage locations into a first tag; and storing the first tag; and
verifying the logins/passwords comprising the steps of:
   selecting memory storage locations based on the login/password data;
   combining random content of the selected memory storage locations into a second tag; and
   verifying that the second tag matches the stored first tag;
wherein said selecting memory storage locations selects a quantity of locations in the range [c*log d, m], where d is the number of bits in the password, m is the total quantity of memory storage locations and c is a number that is independent of d and m; and
wherein said selecting memory storage locations includes using extractors and said combining random content uses a pairwise independent hash function.

2. A method of constructing login/password protocols for registering and verifying logins/passwords in a server comprising the steps of:
registering the logins/passwords comprising the steps of:
   selecting memory storage locations fewer than all memory storage locations in the server for login/password data based on the login/password data;
   combining random content of the selected memory storage locations into a first tag; and
   storing the first tag; and
verifying the logins/passwords comprising the steps of:
   selecting memory storage locations based on the login/password data;
   combining random content of the selected memory storage locations into a second tag; and
   verifying that the second tag matches the stored first tag;
wherein said selecting memory storage locations selects a quantity of locations in the range [c*log d, m], where d is the number of bits in the password, m is the total quantity of memory storage locations and c is a number that is independent of d and m; and
wherein said selecting memory storage locations includes using k-wise independent hash functions and said combining random content is based on the content returned by said selecting memory storage locations and extractors.

3. A server for constructing login/password protocols for registering and verifying logins/passwords comprising:
means for registering the logins/passwords comprising:
   means for selecting memory storage locations fewer than all memory storage locations in the server for login/password data based on the login/password data;
   means for combining random content of the selected memory storage locations into a first tag; and
means for storing the first tag; and
means for verifying the logins/passwords comprising:
   means for selecting memory storage locations based on the login/password data;
   means for combining random content of the selected memory storage locations into a second tag; and
   means for verifying that the second tag matches the stored first tag;
wherein said selecting memory storage locations selects a quantity of locations in the range [c*log d, m], where d is the number of bits in the password, m is the total quantity of memory storage locations and c is a number that is independent of d and m; and
wherein said means for selecting memory storage locations includes using extractors and said means for combining random content uses a pairwise independent hash function.

4. A server for constructing login/password protocols for registering and verifying logins/passwords comprising:
means for registering the logins/passwords comprising:
   means for selecting memory storage locations fewer than all memory storage locations in the server for login/password data based on the login/password data;
   means for combining random content of the selected memory storage locations into a first tag; and
means for storing the first tag; and
means for verifying the logins/passwords comprising:
   means for selecting memory storage locations based on the login/password data;
   means for combining random content of the selected memory storage locations into a second tag; and
   means for verifying that the second tag matches the stored first tag;
wherein said selecting memory storage locations selects a quantity of locations in the range [c*log d, m], where d is the number of bits in the password, m is the total quantity of memory storage locations and c is a number that is independent of d and m; and
wherein said means for selecting memory storage locations includes using k-wise independent hash functions and said means for combining random content is based on the content returned by said means for selecting memory storage locations and extractors.

* * * * *

UNITED STATES PATENT AND TRADEMARK OFFICE
CERTIFICATE OF CORRECTION

PATENT NO. : 8,528,060 B2  
APPLICATION NO. : 11/644368  
DATED : September 3, 2013  
INVENTOR(S) : Di Crescenzo et al.

It is certified that error appears in the above-identified patent and that said Letters Patent is hereby corrected as shown below:

On the Title Page, Item (54) and in the Specification, in Column 1, Line 3, under "Title", delete "MODE WITH SECURITY DICTIONARY" and insert -- MODEL WITH SECURITY AGAINST DICTIONARY --, therefor.

In the Specification

In Column 5, Line 36, delete "Detection.," and insert -- Detection --, therefor.

In Column 7, Line 29, delete "$\{0,1\}^d.\{0,1\}^d \rightarrow \{1,...,m\}^1$," and insert -- $\{0,1\}^d \cdot \{0,1\}^d \rightarrow \{1,...,m\}^1$, --, therefor.

In Column 7, Line 35, delete "$\{0,1\}^d \cdot \{0.1\}^d \rightarrow \{0,1,.....,m\}^1$," and insert -- $\{0,1\}^d \cdot \{0,1\}^d \rightarrow \{1,.....m\}^1$, --, therefor.

In Column 7, Line 43, delete "$m=m_x+t$)." and insert -- $m=m_x+t$. --, therefor.

In Column 8, Line 46, delete "(log 2d) (log(m/(m-q))));" and insert -- (log 2d)·(log(m/(m-q))); --, therefor.

In Column 10, Line 18, delete "passed"" and insert -- passed". --, therefor.

In the Claims

In Column 12, Line 6, in Claim 3, delete "login/password data:" and insert -- login/password data; --, therefor.

Signed and Sealed this  
Seventh Day of April, 2015

Michelle K. Lee  
*Director of the United States Patent and Trademark Office*

CERTIFICATE OF CORRECTION (continued)
U.S. Pat. No. 8,528,060 B2

In Column 12, Line 31, in Claim 4, delete "login/password data:" and insert -- login/password data; --, therefor.